No. 778,811. Patented December 27, 1904.

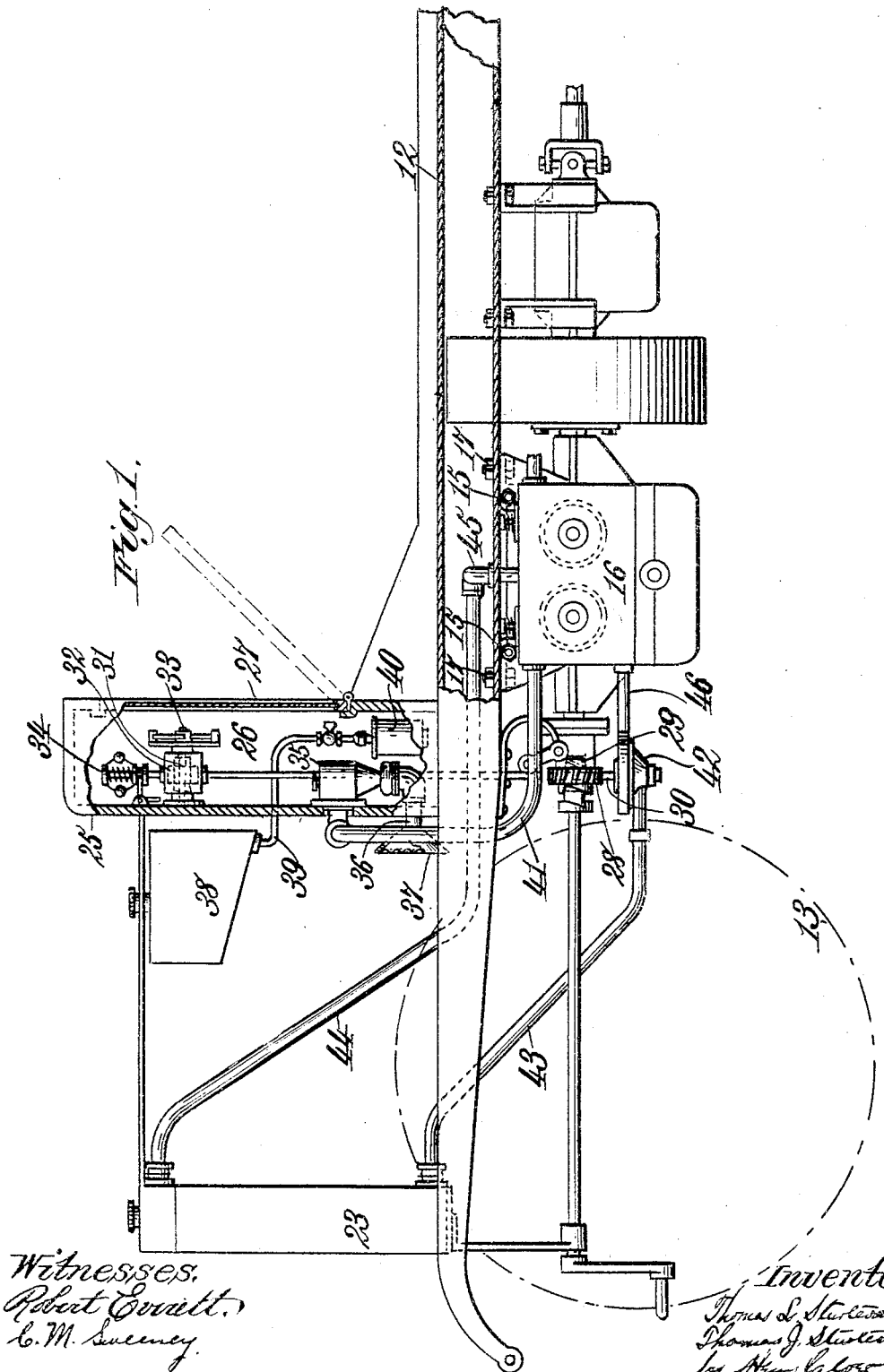

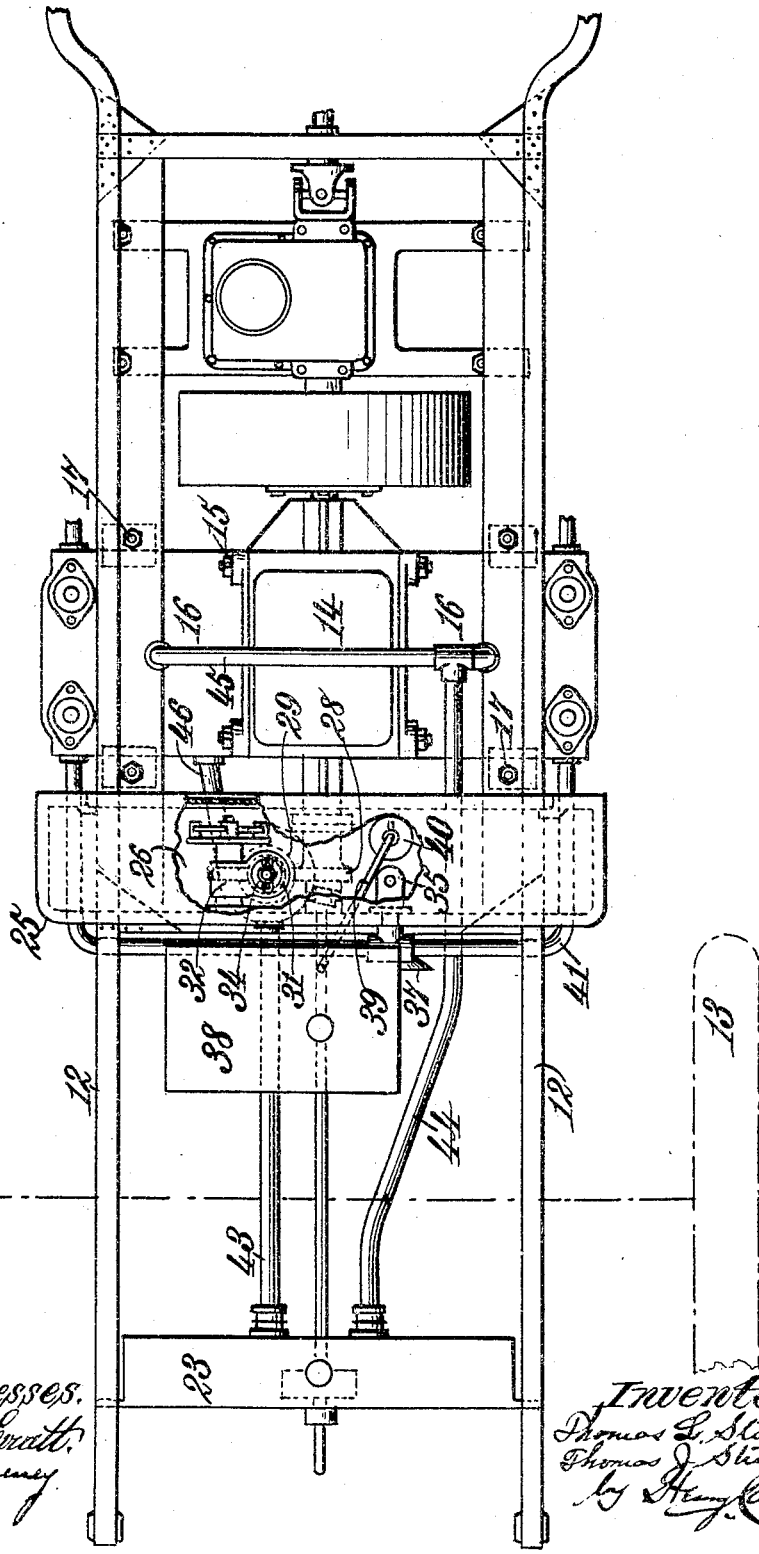

UNITED STATES PATENT OFFICE.

THOMAS L. STURTEVANT, OF QUINCY, AND THOMAS J. STURTEVANT, OF WELLESLEY, MASSACHUSETTS.

MOTOR-VEHICLE.

SPECIFICATION forming part of Letters Patent No. 778,811, dated December 27, 1904.

Application filed July 6, 1904. Serial No. 215,460.

*To all whom it may concern:*

Be it known that we, THOMAS L. STURTEVANT, residing at Quincy, and THOMAS J. STURTEVANT, residing at Wellesley, in the county of Norfolk and State of Massachusetts, citizens of the United States, have invented certain new and useful Improvements in Automobiles or Motor-Vehicles, of which the following is a specification, reference being had therein to the accompanying drawings.

This invention relates to automobiles or motor-vehicles, and has for its object to provide a dashboard or dasher having an inclosed space in which many parts are located and which is preferably provided at its rear side, or on the side thereof adjacent to the driver, with a transparent door through which the parts may be observed and which may be opened for convenient access thereto.

In the accompanying drawings, Figure 1 is a side view of the forward part of the chassis or running-gear of an automobile embodying the present invention, and Fig. 2 is a plan view of the same.

Referring to the drawings, 12 denotes the side bars or side beams of the chassis or running-gear frame of the vehicle and which, as will be seen from Fig. 2, are bent toward each other in forming the forward part of the vehicle-frame for the purpose of giving a better clearance for the forward wheels 13 of the vehicle to enable sharp turns to be made, as also for the purpose of so mounting a transversely-arranged opposed cylinder-engine in such a manner that the cylinder portions of the engine-frame will project laterally on each side of the vehicle-frame a sufficient distance to permit of ready access to the valve mechanisms and sparking plugs of the engine for the purpose of adjustment or repairs.

The vehicle herein shown is provided with an explosion or gas engine, although the invention is not to be understood as being limited to any particular form of engine.

The engine-frame herein shown comprises a crank-case 14, to the opposite ends of which are attached, by bolts and nuts 15, the cylinder-casings 16, which are secured beneath the side bars 12 of the vehicle-frame by bolts and nuts 17.

The dashboard or dasher 25 of the vehicle is made hollow, so as to form an inclosed chamber 26, in which are conveniently located many of the necessary parts of the motor-vehicle, the said chamber being preferably formed by permanent front, top, and sides, but having an opening at its rear or on the side thereof toward the driver of the vehicle, said opening being preferably closed by a transparent door 27, through which the parts located in the chamber of the dasher may be observed and which may be readily opened for access to the dasher-chamber. The parts inclosed within the dasher-space are thus well protected from the weather and dust. The engine-shaft is provided at its forward end with a worm-wheel 28, meshing with a worm-wheel 29 on a vertical shaft 30, which extends upward into the dasher-chamber, where it is provided with a second worm-wheel 31, meshing with a worm gear-wheel 32, which drives the sparker 33, said shaft being preferably provided at its top with a centrifugal governor 34. Within the dasher-chamber may be located gages to show water, oil, or gasolene levels, as also a sight-feed oil-pump and other parts, all of which may be readily observed by the driver through the glass door of the dasher. Also within the dasher-chamber is preferably located the carbureter 35, having an air-inlet pipe 36, provided with a funnel 37, and which carbureter is supplied with gasolene or other liquid hydrocarbon from a gasolene-tank 38, connected by a pipe 39 with a reservoir 40, suitably connected with the carbureter. The said tank 38 is mounted above the reservoir 40, as shown, and preferably just forward of the dashboard 25 in the upper part of the hood or bonnet of the vehicle, so that the fuel will run to the said carbureter-reservoir 40 by gravity through the pipe 39, the bottom of the tank 38 being inclined, as shown, so as to insure delivery of all the gasolene in the tank 38 to the reservoir and carbureter. With the egress or outlet pipe of the carbureter are connected suitable pipes 41 to convey gaseous fuel to the engine.

A centrifugal pump 42, located at the lower end of and driven from the vertical shaft 30, is provided for the purpose of keeping up a proper circulation of water, said pump being connected with the cooler 23 by a pipe 43 and the water from the cooler being caused to return to the jackets of the engine-cylinders through pipes 44 and 45, forming part of the water-circulating system, the water-jackets of the engine-cylinders being connected with the said pump by pipes 46.

The invention is not to be understood as being limited to the details of construction herein shown and described, as these may be varied widely without departing from the spirit of the invention.

Having thus described our invention, we claim and desire to secure by Letters Patent—

1. In an automobile, the combination with a vehicle-frame, of a dashboard, a carbureter supported by said dashboard, and a fuel-supply tank located above the level of said carbureter and delivering fuel thereto by gravity.

2. In an automobile, the combination with a vehicle-frame, of an inclosed dashboard, a carbureter housed within said dashboard, and a fuel-supply tank located above the level of said carbureter and delivering fuel thereto by gravity.

3. In an automobile, the combination with a vehicle-frame, of an inclosed dashboard, a carbureter arranged within said dashboard, and an air-intake funnel for said carbureter opening through the front of said inclosed dashboard.

4. In an automobile, the combination with a vehicle-frame, of an inclosed dashboard, a carbureter arranged within said dashboard, a hood or bonnet in front of said dashboard, and a fuel-supply tank located in the upper part of said hood or bonnet above said carbureter, so that the fuel will run by gravity from said tank to said carbureter.

5. In an automobile, the combination with a vehicle-frame, of a dashboard proper comprising separated front and rear walls to provide an inclosed chamber or space between them, the said rear wall having a door to give convenient access to the dashboard-chamber.

6. In an automobile, the combination with a vehicle-frame, of an inclosed dashboard or dasher having a transparent door at its rear side.

7. In an automobile, the combination with the vehicle-frame, of a dasher comprising a housing to form an inclosed chamber, a power-driven shaft extending within the said chamber, and auxiliary automobile parts mounted in said chamber and operated from said power-driven shaft.

8. In an automobile, the combination of a vehicle-frame, of a dashboard or dasher having walls or sides to form an inclosed chamber, a vertical shaft geared to the engine-shaft and extending into the said inclosed chamber, and auxiliary automobile parts or mechanism mounted in said inclosed chamber and operated from said vertical shaft.

9. In an automobile, the combination with a vehicle-frame, of a dashboard or dasher having walls or sides to form an inclosed chamber, a vertical shaft geared to the engine-shaft and extending into said chamber, a centrifugal pump at the lower end of said vertical shaft, and power-driven parts in said dasher-chamber operated from said vertical shaft.

10. In an automobile, the combination with a vehicle-frame, of an opposed cylinder-engine hung to said vehicle-frame, a dashboard or dasher having walls or sides to form an inclosed chamber, a vertical shaft geared to the engine-shaft and extending into said chamber, a centrifugal pump at the lower end of the said vertical shaft, and power-driven parts in said dasher-chamber operated from said vertical shaft.

In testimony whereof we affix our signatures in presence of two witnesses.

THOMAS L. STURTEVANT.
THOMAS J. STURTEVANT.

Witnesses:
  W. T. ELLIS,
  R. M. GAY.